United States Patent [19]

Nakayama et al.

[11] Patent Number: 4,994,911
[45] Date of Patent: Feb. 19, 1991

[54] IMAGE INFORMATION SIGNAL TRANSMITTING SYSTEM WITH SELECTIVE TRANSMISSION OF INPUT DATA OR EXTRACTED DATA

[75] Inventors: Tadayoshi Nakayama; Hisashi Ishikawa, both of Kanagawa; Susumu Kozuki, Tokyo; Koji Takahashi, Kanagawa; Katsuji Yoshimura, Kanagawa; Kenichi Nagasawa, Kanagawa; Tomohiko Sasatani, Kanagawa, all of Japan

[73] Assignee: Canon Kabushiki Kaisha, Tokyo, Japan

[21] Appl. No.: 325,549

[22] Filed: Mar. 20, 1989

[30] Foreign Application Priority Data

Mar. 28, 1988 [JP] Japan ................................ 63-071967

[51] Int. Cl.⁵ .............................................. H04N 7/12
[52] U.S. Cl. ..................................... 358/135; 358/136
[58] Field of Search ............... 358/133, 141, 135, 136, 358/138

[56] References Cited

U.S. PATENT DOCUMENTS 4,797,741  1/1989  Sato et al. ........................... 358/138
4,837,632  6/1989  Kubo et al. ......................... 358/133

Primary Examiner—Victor R. Kostak
Attorney, Agent, or Firm—Robin, Blecker, Daley & Driscoll

[57] ABSTRACT

A transmission system, of the type wherein input data to be transmitted is stored in blocks and less than all stored data is extracted from the blocks for transmission and the extracted data is subjected to interpolation to restore all of the data, includes computing circuits for obtaining respective differences between input data and restored data and between input data and stored data and the sums of such differences, and further computing and comparison circuits operating with such differences sums to effect selective transmission of the input data or the extracted data.

6 Claims, 7 Drawing Sheets

IMAGE INFORMATION SIGNAL TRANSMITTING SYSTEM WITH SELECTIVE TRANSMISSION OF INPUT DATA OR EXTRACTED DATA

BACKGROUND OF THE INVENTION

1. Field of the Invention

This invention relates to an image information signal transmitting system for transmitting an image information signal.

2. Description of the Related Art

In transmitting information such as image information, it has been considered important to find a way how to reduce the transmitting amount of information while ensuring reproduction of the original image with fidelity. Hence, various transmission methods have been proposed. They include an adaptive type variable-density sampling method by which sampling density, that is, the density of transmitted information is suitably changed. This method is based on the following concept: Generally, areas of a high spatial frequency and areas of a low spatial frequency commingle within an image. The transmitting amount of information can be adequately reduced by increasing the sampling density for the area of a high spatial frequency and by decreasing it for the area of a low spatial frequency. In accordance with the adaptive type variable-density sampling method, a picture is divided into areas of high sampling density and areas of low sampling density on the basis of the spatial frequency or the like for the purpose of keeping the transmitting amount unvarying for each picture as a whole. However, according to this method, some area that has a relatively low spatial frequency tends to be erroneously allotted to the low density sampling. Although the error may not be serious for a moving image part of the picture, it shows up as deterioration of picture quality in a still image part for which the resolution of the human sight becomes high.

Meanwhile, there has been proposed a transmission system which is arranged to enhance picture quality by utilizing the fact that such continuous images as those of an ordinary TV signal are correlative with each other even in the direction of time base. In other words, the transmission system takes into consideration the correlativity in the time base direction in addition to the two-dimensionally expanding image information. The signal receiving side of the system does not require renewal of picture element data and permits omission of signal transmission at least for the still image area of the picture. This omission permits the transmission density to be increased for other areas to enhance picture quality. Hereinafter the method of utilizing the correlativity in the time base direction will be called the three dimensional TAT (time-axis transformation) method.

In the case of the three-dimensional TAT method, one picture is divided into a plurality of picture element blocks. The amount of information to be transmitted for one picture is arranged to be unvarying. For example, each picture element block is controlled in a prescribed manner in such a way as to have the transmitting amount of information for one picture compressed at a rate of ½. The one of the following modes is allotted to each of the picture element blocks: A mode in which data for all the picture elements included in the block is transmitted (hereinafter referred to as a mode "e"); another mode in which data only for basic picture elements of the block is transmitted (hereinafter referred to as a mode "c"); and a further mode in which data for the corresponding block of a previously transmitted picture is utilized (hereinafter referred to as a mode "p"). With one of these different modes allotted, the image is reproduced with a signal processing operation corresponding to the allotted mode carried out on the signal receiving side. A signal indicative of allotment of the transmission mode is separately transmitted as a mode information signal. Further, the mode "p" may be arranged in the following manner: The basic picture element data is first transmitted alone like in the case of the mode "c"; then, the data transmitted is compared with the data of the corresponding block of the preceding picture on the signal receiving side; and, if the currently received data is found to be the same as the previously received data, the transmission mode is determined to be the mode "p" instead of the mode "c". The details of the conventional three-dimensional TAT method are as described below:

In the conventional three-dimensional TAT method, a thinning-out and interpolating operation is first carried out. After that, a block distortion Dc taking place during transmission in the mode "c" is computed beforehand by comparing the result of the thinning-out and interpolating operation with a real value. Further, for finding the correlativity in the time base direction, the image signal of the preceding picture is stored in a frame memory. Another block distortion Dp which represents timewise correlativity is computed by comparing the picture element data of the preceding picture with that of the current picture for every picture element block. The block distortion values Dc and Dp are compared with each other. As a result, a discrimination signal Dc/Dp indicating which of the two values is larger is obtained. The smaller block distortion is used as transmission mode determining block distortion Dm. In other words, a check is made for every picture element block to find which of the mode "c" transmission and the mode "p" transmission has a less block distortion. If block distortion Dc of the former is found larger than the block distortion Dp of the latter, the mode "c" is not selected. If latter distortion Dp is found to be larger than the former distortion Dc, the mode "p" is not selected. However, a picture element block which is transmitted in the mode "c" for the preceding picture cannot be improved in picture quality if it is transmitted in the mode "p" for the current picture. In view of this, a picture element block transmitted in the mode "e" for the preceding picture is transmitted in the mode "p" for the current picture.

The block distortion is thus computed for all the picture element blocks constituting one picture. After that, the transmission modes are allotted to the picture element blocks as applicable in such a way as to have the transmitting amount of information for one picture unvarying from a given value which is set, for example, at ½ in terms of a compression rate. Then, the picture element data of each picture element block is transmitted one after another in the mode allotted. On the signal receiving side, each of the transmitted data is compared with the basic picture element data of the same block received for the preceding picture. If the data is found to be the same as that of the preceding picture, the transmission mode is determined to be the mode "p" and the data of the preceding picture is utilized for image reproduction. If the data is found to differ, the mode is determined to be the mode "c" and the image is reproduced through an interpolation process.

FIG. 1 of the accompanying drawings shows the mode distribution for the block distortions Dc and Dp. FIG. 2 shows the ratio of distribution determined according to the timewise correlation of images. A block having a greater degree of movement is located in a higher place on the axis of Dp. Meanwhile, a block having a higher degree of fineness, i.e., a block of a two-dimensionally higher frequency is located farther rightward on the axis of Dc. The mode "c" or the mode "p" is selected according to the magnitude relation between the block distortion values Dc and Dp. Therefore, the picture element blocks located above the straight line Dc=Dp of FIG. 1 are transmitted basically in the mode "c" and the blocks located below the straight line in the mode "p". The value Dm of a picture element block located at a point Xc is a value obtained on the axis Dc by drawing a perpendicular line. The value Dm of a picture element block located at a point Xp is a value obtained on the axis Dc by drawing a first perpendicular line to the axis Dp and further by drawing a second perpendicular line to the axis Dc from an intersection between the first line and the above-stated straight line Dc=Dp. On the axis of Dm of FIG. 1, there is shown a threshold value T1 which is to be used in selecting the mode "e". This value T1 becomes a threshold value T2 on the axes Dc and Dp. In other words, this means that any picture element block having a vigorous movement and a high degree of fineness is transmitted in the mode "e".

The mode allotment distribution ratio is as follows: Assuming that the data compressing rate for one whole picture is fixedly set at ½ and that the amount of picture element data to be transmitted in the modes "c" and "p" is ¼ of the amount of the picture element data constituting one picture element block, the number of picture element blocks to be transmitted in the mode "e" is ⅓ of the whole picture. In other words, as shown in FIG. 2, ⅓ of the total number of blocks are transmitted in the mode "e". The rest are transmitted either in the mode "p" or in the mode "c" according to the block distortion Dc or Dp. In FIG. 2, the part on the right side of a straight line corresponds to a case where there is no correlation between the preceding picture and the current picture. A part on the left side of the straight line corresponds to a case where a completely still image is transmitted. This gives the same degree of resolution as in the case of transmitting all the picture element blocks in the mode "e". The mode allotment distribution rate of any picture is indicated by the lengths of line segments of a broken line A defined by areas e, c and p in FIG. 2. The position of the broken line A varies with the timewise correlativity of the image information.

In order to transmit the image information as efficiently as possible within the limited transmitting amount of image information, the modes "e", "p" and "c" must be allotted in a manner apposite to the characteristic of the visual sensation of the human eye and that of the transmitting system. However, the conventional system is merely arranged to simply compare the block distortions Dc and Dp with each other and to use the smaller of them as block distortion Dm for determining the transmission mode. Therefore, even in the case of a picture element block wherein the distortion Dp is only slightly larger than the distortion Dc, the mode "c" is allotted to the block. Further, the sampling clock signal has a considerable amount of jitters in terms of hardware. In processing a still image, therefore, the jitters might cause the mode "c" to be allotted by mistake to a picture element block to which the mode "p" should be allotted. Some noise that is included in the signal source might likewise bring about the same problem. Further, even if the block distortion Dp is accurately detectable, the selection between the distortions Dp and Dc simply on the basis of a smaller value does not always lessen the deterioration of picture quality in terms of visual sensation, because the nature of the block distortions Dp differs from that of the block distortion Dc.

SUMMARY OF THE INVENTION

It is a general object of this invention to provide an image information signal transmitting system which is capable of solving the above-stated problems of the prior art.

It is a more specific object of the invention to provide an image information signal transmitting system which is arranged, by taking into consideration the characteristic of the visual sensation of the human eye, to be capable of efficiently transmitting an image information signal by minimizing the deterioration of picture quality in terms of visual sensation.

Under this object, an image information signal transmitting system arranged according to this invention as an embodiment thereof comprises:

input means for inputting an image information signal composed of a plurality of picture element data corresponding to one picture;

storing means for storing the plurality of picture element data inputted by the input means by blocks each of which is composed of a predetermined number of picture element data;

extracting means for dividing the plurality of picture element data inputted by the input means into the blocks, for extracting from each of the blocks a fewer number of picture element data than the predetermined number of picture element data of which each of the blocks is composed, and for outputting the extracted picture element data;

interpolating means for interpolating picture element data which has not been extracted by the extracting means by using picture element data which has been extracted by the extracting means to restore the plurality of picture element data;

first computing means for comparing the plurality of picture element data inputted by the input means with the plurality of picture element data restored by the interpolating means for every one of the blocks to obtain differences therebetween, and for computing the sum of the differences for every one of the blocks to output the sum as first computed data;

second computing means for comparing the plurality of picture element data inputted by the input means with the plurality of picture element data stored by the storing means for every one of the blocks to obtain differences therebetween, and for computing the sum of the differences for every one of the blocks to output the sum as second computed data;

third computing means for computing and outputting third computed data by multiplying the first computed data output from the first computing means by a first constant, adding the result of multiplication to the second computed data output from the second computing means, subtracting a second constant from the result of addition and, after that, multiplying the result of subtraction by a third constant;

fourth computing means for computing and outputting fourth computed data by multiplying the second computed data output from the second computing means by a fourth constant and adding the result of multiplication to the first computed data output from the first computing means;

comparing means for comparing a level of the second computed data output from the second computing means with that of fifth computed data obtained by multiplying the first computed data output from the first computing means by a fifth constant and adding a sixth constant to the result of multiplication, and for outputting discrimination data indicative of the kind of computed data which is found to be at a lower level as a result of comparison;

output switching means for selectively outputting one of the third computed data output from the third computing means and the fourth computed data output from the fourth computing means according to the discrimination data output from the comparing means;

transmission mode determining means for determining a transmission mode to be selected for every one of the blocks, according to the discrimination data output from the output switching means, from between a transmission mode in which all the predetermined number of picture element data of which each of the blocks is composed are transmitted and a transmission mode in which not all of the predetermined number of picture element data are transmitted; and selective output means for selectively outputting, in accordance with a transmission mode determined by the transmission mode determining means, one of the plurality of picture element data inputted by the input means and the picture element data extracted by the extracting means.

The above and other objects and features of the invention will become apparent from the following detailed description of embodiments thereof taken in connection with the accompanying drawings.

DETAILED DESCRIPTION OF THE PREFERRED EMBODIMENTS

Figure 1:
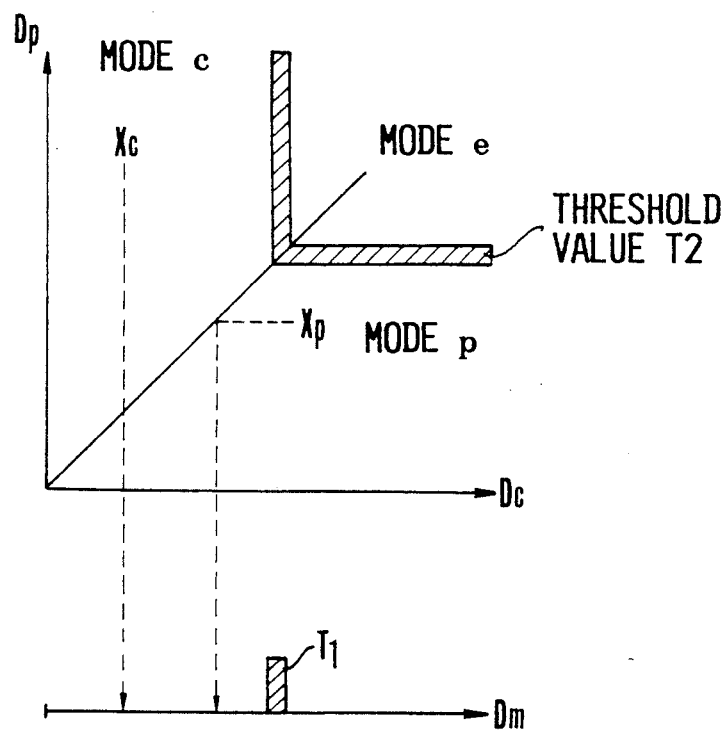
FIGS. 1 and 2 show the conventional arrangement made in a three-dimensional TAT transmission system for allotment of transmission modes.
Figure 2:
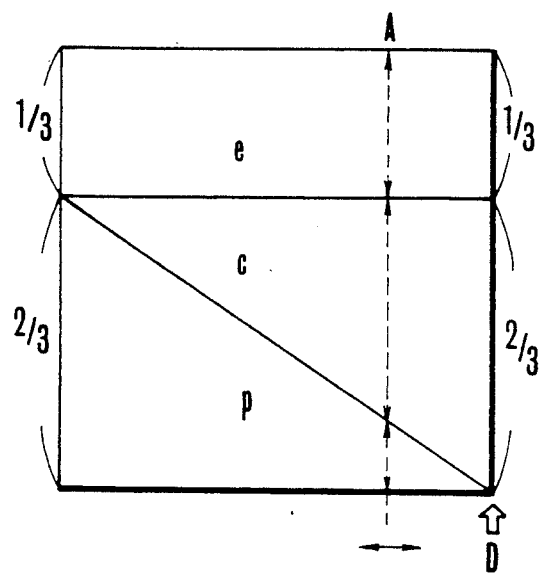
Figure 3:
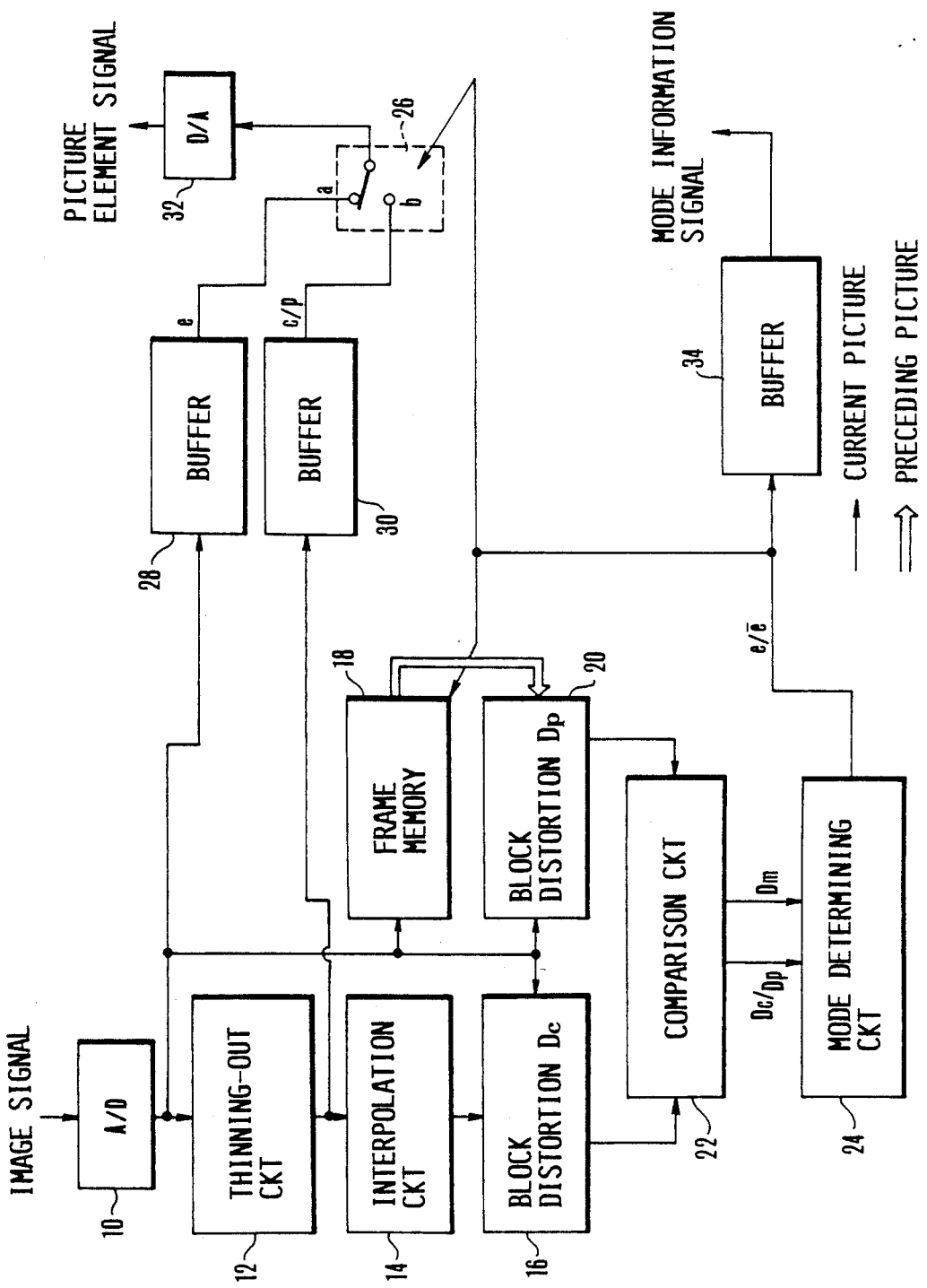
FIG. 3 is a block diagram showing the arrangement of the transmitting system of an image information signal transmitting system arranged according to this invention as a first embodiment thereof.

An embodiment of this invention is described below with reference to the accompanying drawings:

FIG. 3 is a block diagram showing the arrangement of the sending system of an image information signal transmitting system arranged according to this invention as a first embodiment thereof. In the case of this embodiment, an analog transmission route is employed.

An analog image signal to be transmitted is converted into a digital signal by an A/D converter 10. All picture element data output from the A/D converter 10 is supplied to a thinning-out circuit 12. The circuit 12 then removes the data of picture elements other than the data of basic picture elements to thin out the block of them. In other words, the thinning-out circuit 12 is arranged to produce picture element data in the mode "c". An interpolation circuit 14 is arranged to restore the thinned-out block of the picture element data to its original state by interpolating the thinned-out picture element data by using the basic picture elements. A block distortion computing circuit 16 is arranged to compute and detect, for every picture element block, a block distortion Dc by comparing the picture element data output from the A/D converter 10 with the picture element data of the restored block output from the interpolation circuit 14.

The output of the A/D converter 10 is supplied also to a frame memory 18. The frame memory 18 is arranged to serve as delay means for delaying the picture element data to a degree corresponding to one picture. In other words, all the data for an immediately preceding picture is stored by the frame memory 18. A block distortion computing circuit 20 is arranged to compute a block distortion Dp by comparing the picture element data of the current picture with the picture element data of the preceding picture for every corresponding blocks of these pictures. This block distortion Dp indicates correlativity obtained in the time base direction.

A comparison circuit 22 is arranged to compare the block distortion values Dc and Dp by attaching weight to them as will be described in detail later; to output the result of comparison as selecting mode data Dc/Dp; and, at the same time, to output smaller one of them as a block distortion Dm which is to be used for determining a transmission mode.

In the case of this embodiment, the block to be transmitted in the mode "p" is arranged to have only the basic picture element data transmitted. Then, on the side of the receiving system, the basic picture element data transmitted is compared with that of the same block of the preceding picture. If these basic data are found to be the same, the transmission mode is determined to be the mode "p". In this instance, the data of the preceding picture is used in place of the data of the current picture. If they differ from each other, the transmission mode is determined to be the mode "c" and the image is restored to its original state through an interpolation process. Further, in the case of a picture element block which has been transmitted in the mode "c" for the preceding picture, improvement in picture quality is hardly expectable from transmitting it in the mode "p" for the current picture. In view of this, a picture element block transmitted in the mode "e" for the preceding picture is transmitted in the mode "p" for the current picture.

Therefore, to keep the transmitting amount for one picture always unvarying, the transmitting system (or part) is arranged to allot to each of the picture element blocks either the transmission mode "e" or the mode "p" or "c". The mode determining circuit 24 is arranged to make this mode allotment according to the output of the comparison circuit 22 and to produce a determination signal. This determination signal controls a switch 26 for every one of the picture element blocks. The switch 26 supplies a D/A converter 32 with all the picture element data which comes from the A/D converter 10 via a buffer 28 in the case of the mode "e". In the event of the mode "c" or "p", the switch 26 supplies the A/D converter 32 with the basic picture element data which comes from the thinning-out circuit 12 via a buffer 30. The D/A converter 32 is arranged to convert the digital picture element data into an analog signal and to send out the analog signal to a transmission route. In the case of transmission in the mode "e", it is not necessary to rewrite the data stored at the frame memory 18 for the applicable picture element block. In this case, therefore, writing into the frame memory 18 is inhibited according to the determination signal output from the mode determining circuit 24. The determination signal output from the mode determining circuit 24 is sent out to the transmission route as mode information via a buffer 34.

Figure 4:
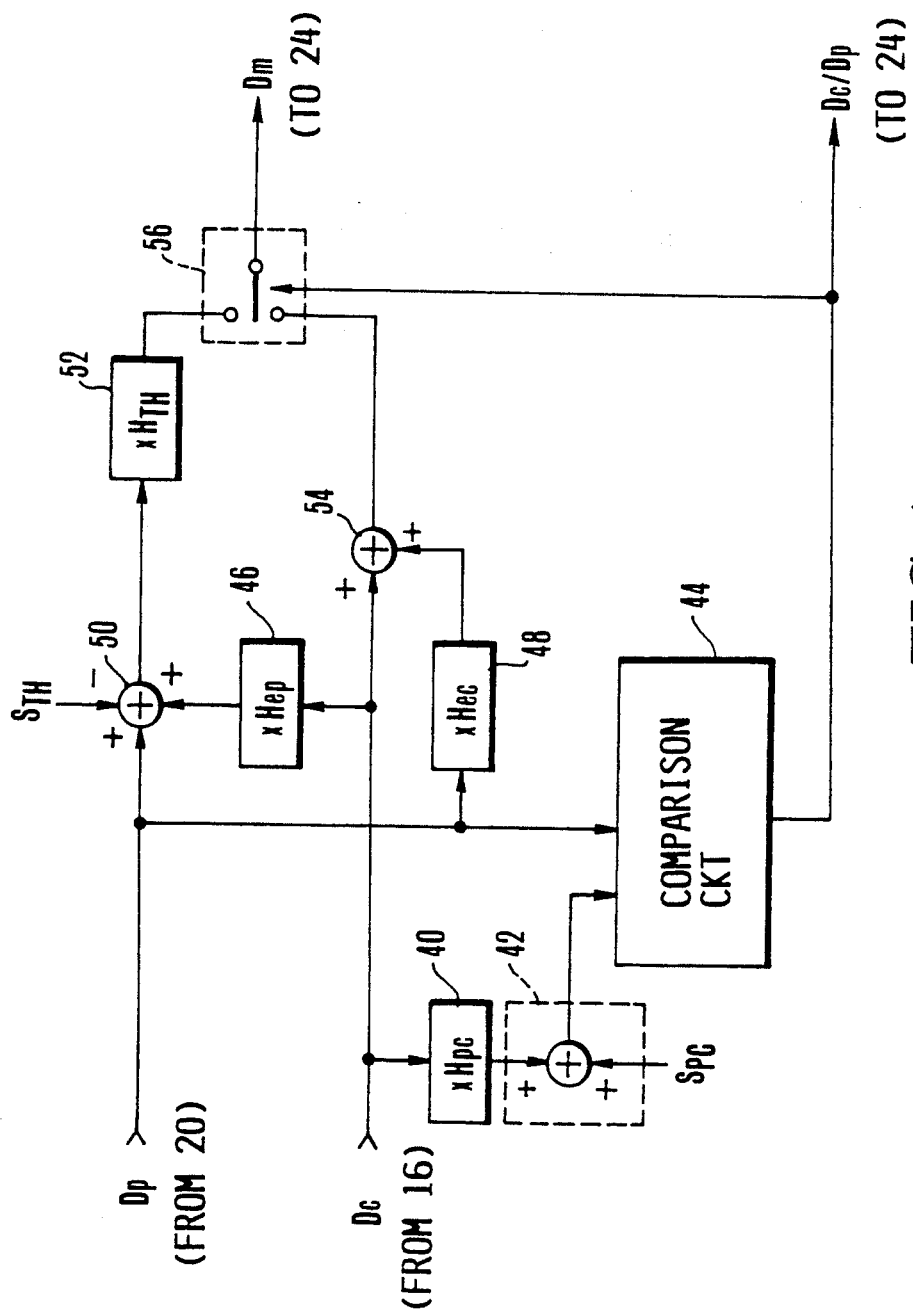
FIG. 4 is a diagram showing by way of example the arrangement of a comparison circuit of FIG. 3.

FIG. 4 shows by way of example a practical arrangement of the comparison circuit 22. The block distortion signal Dc output from the block distortion computing circuit 16 of FIG. 3 is supplied to a multiplier 40 of FIG. 4. The multiplier 40 then multiplies the signal Dc by a constant Hpc. An adder 42 adds a constant Spc to the output of the multiplier 40. A comparison circuit 44 compares the output of the adder 42 with the block distortion signal Dp output from the block distortion computing circuit 20 of FIG. 3. The result of the comparison is output from the comparison circuit 44 as selecting mode data Dc/Dp. Further, the input signal Dc is supplied also to a multiplier 46 to be multiplied by a constant Hep. The input signal Dp is supplied to another multiplier 48 to be multiplied by a constant Hec. An adder-subtracter 50 adds the output of the multiplier 46 to the input signal Dp and subtracts a constant $S_{TH}$ from the input. A multiplier 52 multiplies the output of the adder-subtracter 50 by a constant $H_{TH}$. An adder 54 adds the output of the multiplier 48 to the input signal Dc. A switch 56 is arranged to selectively output either the output of the multiplier 52 or that of the adder 54 as a transmission mode determining block distortion signal Dm according to the output of the comparison circuit 44.

Figure 5:
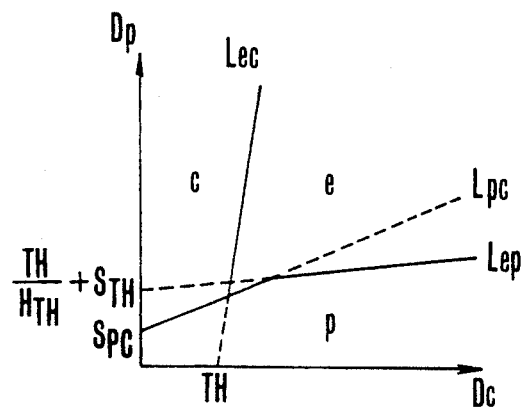
FIG. 5 shows the mode allotment to be made by the comparison circuit shown in FIG. 4.

FIG. 5 shows how the modes "e", "p" and "c" are allocated on the plane Dc-Dp by the comparison circuit 22. The areas to which these modes are allotted are defined by three straight lines Lpc, Lep and Lec. The line Lec passes a point TH on an axis Dc at an inclination of 1/Hec. The point TH indicates a threshold value to be used in allotting the mode "e" on the basis of the block distortion Dm. The line Lep passes a point $(TH/H_{TH}+S_{TH})$ on an axis Dp at an inclination of Hep. The line Lpc passes a point Spc on the axis Dp at an inclination of Hpc.

Figure 6:
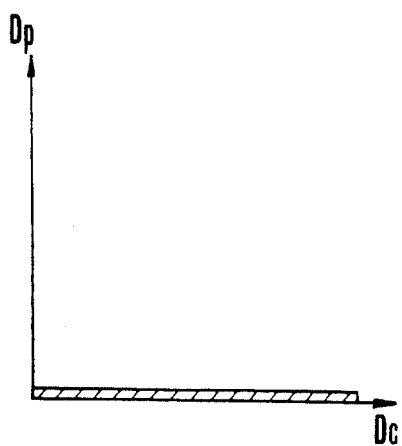
FIGS. 6, 7 and 8 show a block distortion distribution obtained on a plane Dc-Dp.

Assuming that a still object is photographed and processed by a camera having no noise nor any jitters in the sampling clock signal, the block distortions are distributed on the plane Dc-Dp in a manner as indicated by a hatched part in FIG. 6. In actuality, however, the image sensing part and the transmission route of the camera have some limited S/N ratio. It is inevitable to have some noise even for a completely still object. The noise then appears in the form of a difference signal representing a difference between frames. As a result, the distribution of block distortions becomes as indicated by hatching in FIG. 7. Further, in a case where the camera has some jitters in the sampling clock signal, it is impossible to sample an exactly same point for different frames. This results in a difference between frames. The difference seldom shows up where the level of the image is even. However, it appears to a greater degree accordingly as the abruptness of image level change increases. In that case, therefore, the distribution of block distortions becomes as shown by hatching in FIG. 8.

Figure 7:
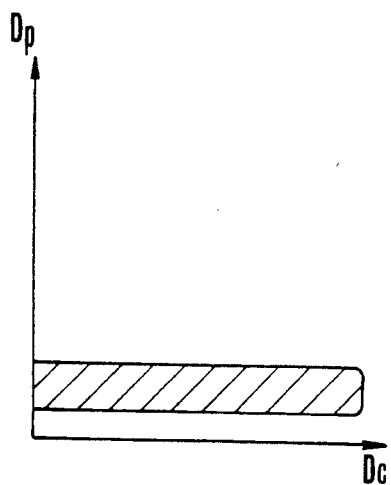
Figure 8:
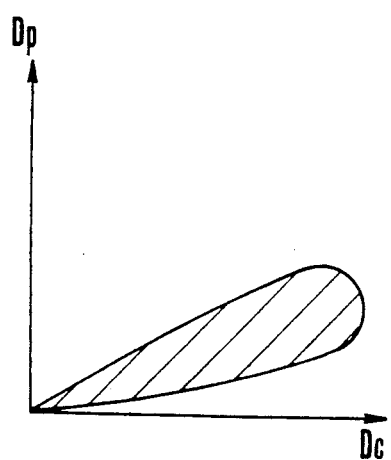

The mode "p" should be allotted to the hatched parts of FIGS. 7 and 8. However, it is impossible in cases where the block distortions Dc and Dp are simply compared like in the case of the conventional arrangement as apparent from comparison with FIG. 5. Whereas, the mode "p" can be allotted to the hatched part in accordance with the arrangement of this embodiment. The optimum values of the constants Hpc, Hep, Hec, $H_{TH}$, Spc and $S_{TH}$ vary according to the magnitude of the jitters in the sampling clock signal and other disturbances.

Figure 9:
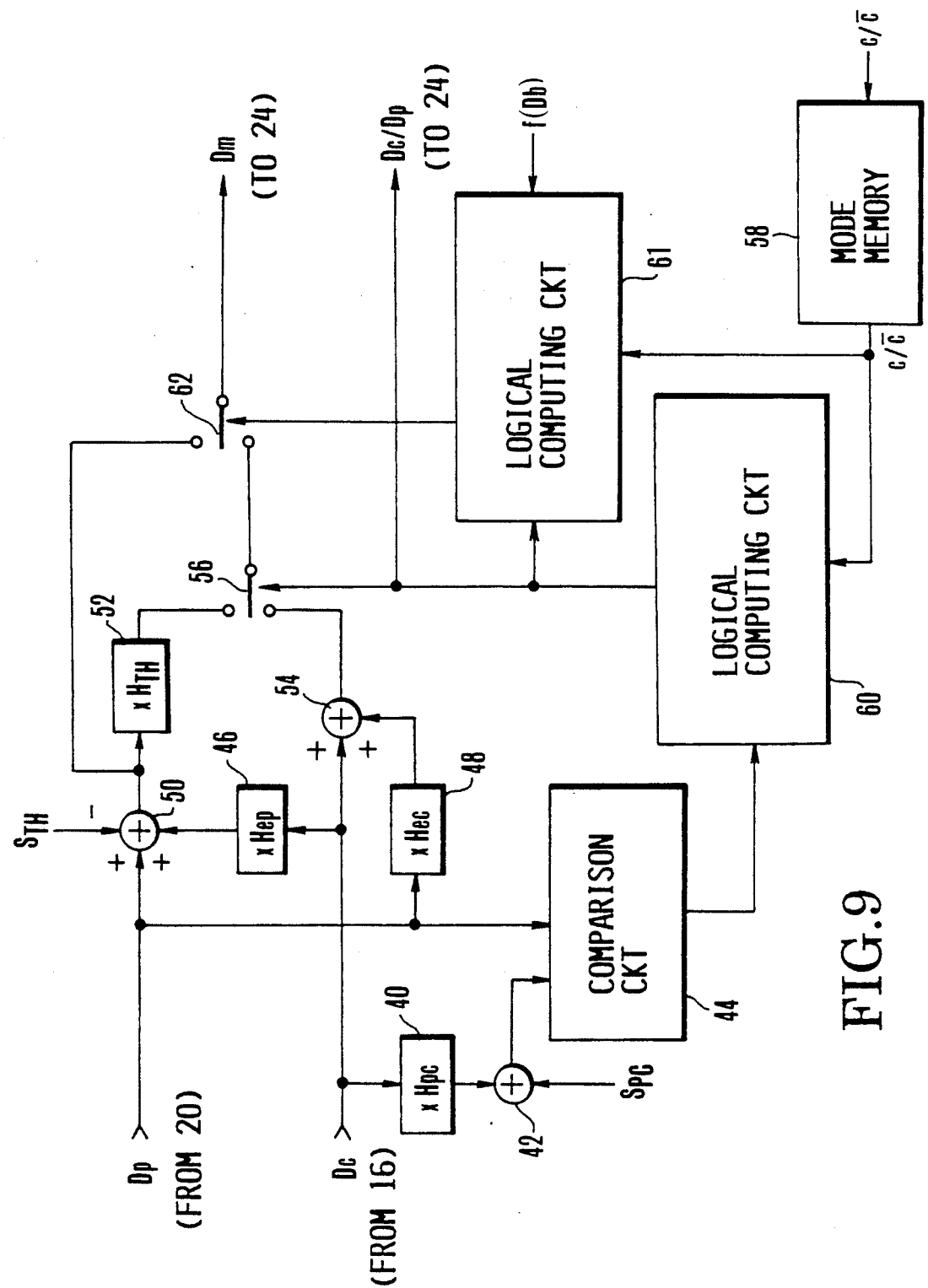
FIG. 9 is a block diagram showing another example of arrangement of the comparison circuit of FIG. 3.

FIG. 9 shows another example of the internal arrangement of the comparison circuit 22. In the case of the comparison circuit shown in FIG. 9, the mode "p" may be allotted on the basis of varied methods including: A method of allotting the mode "p", for the current frame (picture), only to the picture element blocks which has been transmitted in the mode "e" or "p" for the preceding frame; and another method wherein, to prevent a picture element block transmitted in the mode "c" from being erroneously determined on the receiving side as in the mode "p", the block is transmitted in the mode "p" when the difference in basic picture elements between frames is small. The comparison circuit shown in FIG. 9 is arranged to permit adoption of these methods. In FIG. 9, the same circuit elements as those of FIG. 4 are indicated by the same reference numerals. Referring to FIG. 9, there is provided a mode memory 58 which is arranged to store discrimination data indicating whether the transmission mode of the corresponding picture element block of the preceding frame is the mode "c". A logical computing circuit 60 is arranged to perform a logical computing operation on a mode "c" discrimination signal obtained from the mode memory 58 and the output of the comparison circuit 44 and to control a switch 56 with the result of the (two instances) computation. The result of computation serves as the selecting mode data Dc/Dp. Another logical computing circuit 61 is arranged to perform a logical computing operation on the output of the other computing circuit 60, the mode "c" discrimination signal from the mode memory 58 and a signal f(Db) representing the result of a discrimination between the largeness and smallness of the difference in basic picture elements between frames. A switch 62 is arranged to be controlled by the output of the computing circuit 61. In cases where there is no fear of having the mode "c" mistaken for the mode "p" on the receiving side, the switch 62 selects the output of the switch 56. In the event of a possibility of the mistake, the switch 62 selects the output of the adder-subtracter 50.

Figure 10:
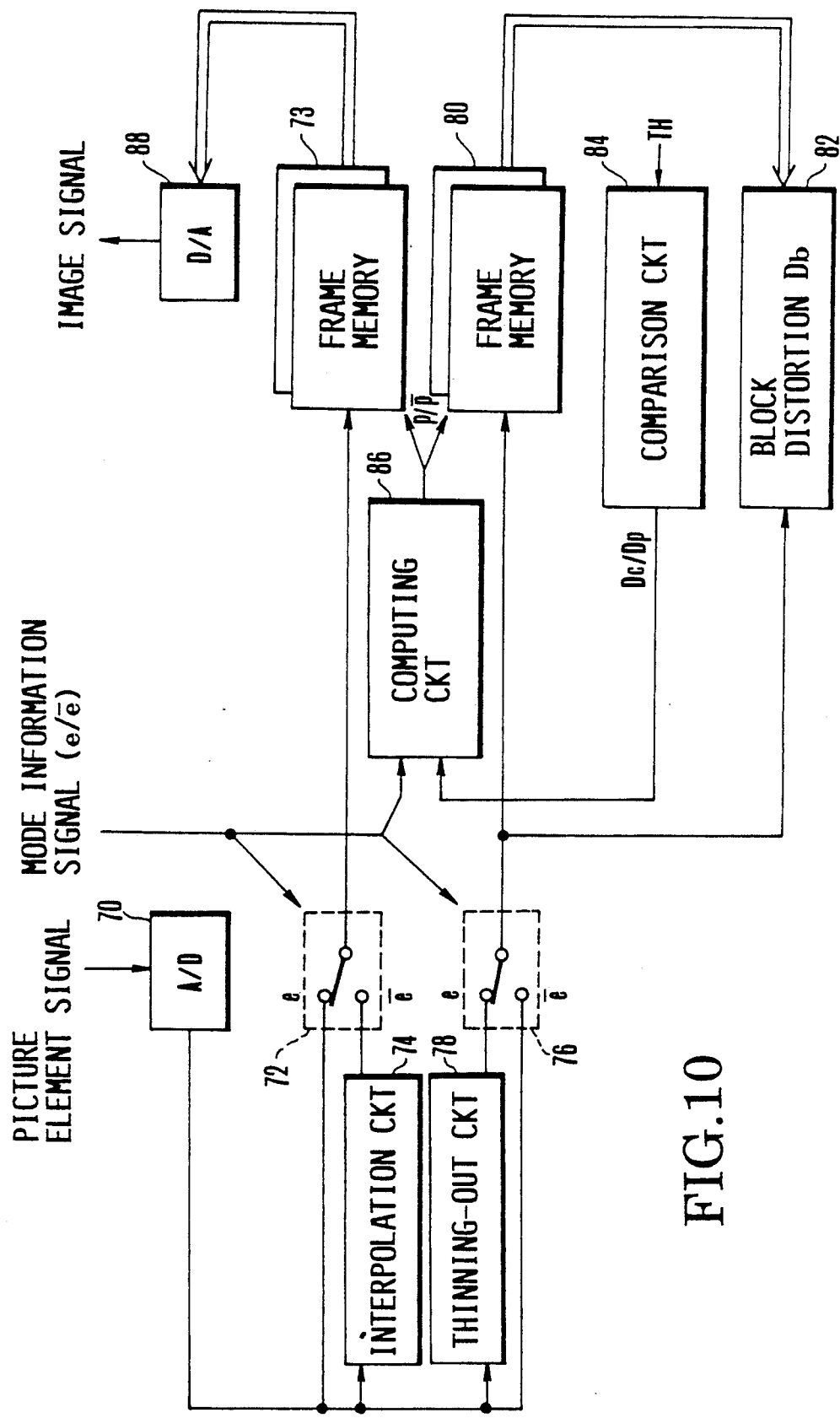
FIG. 10 is a block diagram showing the arrangement of receiving system corresponding to the sending system of the image information signal transmitting system of FIG. 3.

FIG. 10 shows by way of example the arrangement of a signal receiving system (part) corresponding to the sending system (part) shown in FIG. 3. Referring to FIG. 10, an analog video signal sent from the sending system shown in FIG. 3 is converted into a digital signal by an A/D converter 70. A switch 72 operates under the control of a mode information signal received in the following manner: In a case where a picture element block is transmitted in the mode "e", the switch 72 outputs all the picture element data of the block as it is. In other cases, the switch 72 outputs picture element data interpolated by an interpolation circuit 74. Therefore, the switch 72 is arranged to always output all the picture element data for each of the picture element blocks. The output of the switch 72 is written into a frame memory 73 which is arranged to store all picture elements. Another switch 76 also operates under the control of the mode information signal received. In the case of transmission in the mode "e", the switch 76 selects the output of a thinning-out circuit 78 which is arranged to take out the basic picture element data from the picture element block being transmitted in the mode "e". In other cases, the switch 76 always outputs the basic picture element data, which is then written into a frame memory 80 arranged to store the basic picture data.

A block distortion computing circuit 82 is arranged to compute a difference between the basic picture element data output from the switch 76 and the basic picture element data of the preceding picture obtained from the frame memory 80. A total value of the computed difference (hereinafter referred to as a block distortion Db) is obtained and output for every picture element block. The block distortion Db is supplied to a comparison circuit 84 to be compared with a threshold value TH. If the value of the block distortion Db is found to be less than the threshold value TH, the picture element block is determined to have been transmitted in the mode "p". A computing circuit 86 is arranged to perform a computing operation on a receiving mode information signal and the output of the comparison circuit 84 to obtain a mode "p" discrimination signal indicating whether the transmission mode is the mode "p" or not. The mode "p" discrimination signal is supplied to the frame memories 73 and 80. In accordance with this signal, the frame memories 73 and 80 are inhibited from being rewritten to leave the stored data of the immediately preceding picture intact for any picture element block that has been transmitted in the mode "p". With the data renewal process performed on the frame memory 73 in the above-stated manner, the data of the memory 73 is read out and supplied to a D/A converter 88. The converter 88 then produces an analog video signal of a high degree of resolution.

In the case of this embodiment, all of the six parameters are used. In actuality, however, the system may be arranged to use only some of them for reduction in cost. Such modifications are possible, because: The applicable parameters of this embodiment may be equivalently set at a values such as "0" and "1" or the like within the scope of this invention. Further, the block distortion signal Dp is arranged to be supplied directly to the comparison circuit 44 in the case of FIG. 4. However, this arrangement may be changed to supply the signal Dp to the comparison circuit 44 after completion of some suitable computing process while the block distortion signal Dc is supplied directly to the comparison circuit 44.

As apparent from the foregoing description, the transmission modes are allotted to the divided areas which are arranged with the characteristic of the visual sensation of the human eye taken into consideration. Therefore, the transmission modes can be efficiently allotted. The embodiment is thus arranged to be capable of transmitting a high quality image within the limited transmission capacity.

What is claimed is:

1. An image information signal transmitting system comprising:

(a) input means for inputting an image information signal composed of a plurality of picture element data corresponding to one picture;

(b) storing means for storing the plurality of picture element data inputted by said input means by blocks each of which is composed of a predetermined number of picture element data;

(c) extracting means for dividing the plurality of picture element data inputted by said input means into the blocks, for extracting from each of the blocks a fewer number of picture element data than the predetermined number of picture element data of which each of the blocks is composed, and for outputting the extracted picture element data;

(d) interpolating means for interpolating picture element data which has not been extracted by said extracting means by using picture element data which has been extracted by said extracting means to restore the plurality of picture element data;

(e) first computing means for comparing the plurality of picture element data inputted by said input means with the plurality of picture element data restored by said interpolating means for every one of the blocks to obtain differences therebetween, and for computing the sum of the differences for every one of the blocks to output the sum as first computed data;

(f) second computing means for comparing the plurality of picture element data inputted by said input means with the plurality of picture element data stored by said storing means for every one of the blocks to obtain differences therebetween, and for computing the sum of the differences for every one of the blocks to output the sum as second computed data;

(g) third computing means for computing and outputting third computed data by multiplying the first computed data output from said first computing means by a first constant, adding the result of multiplication to the second computed data output from said second computing means, subtracting a second constant from the result of addition and, after that, multiplying the result of subtraction by a third constant;

(h) fourth computing means for computing and outputting fourth computed data by multiplying the second computed data output from said second computing means by a fourth constant and adding the result of multiplication to the first computed data output from said first computing means;

(i) comparing means for comparing a level of the second computed data output from said second computing means with that of fifth computed data obtained by multiplying the first computed data output from said first computing means by a fifth constant and adding a sixth constant to the result of multiplication, and for outputting discrimination data indicative of the kind of computed data which is found to be at a lower level as a result of comparison;

(j) output switching means for selectively outputting one of the third- computed data output from said third computing means and the fourth computed data output from said fourth computing means according to the discrimination data output from said comparing means;

(k) transmission mode determining means for determining a transmission mode to be selected for every one of the blocks, according to the discrimination data output from said output switching means, from between a transmission mode in which all the predetermined number of picture element data of which each of the blocks is composed are transmitted and a transmission mode in which not all of the predetermined number of picture element data are transmitted; and (l) selective output means for selectively outputting, in accordance with a transmission mode determined by said transmission mode determining means, one of the plurality of picture element data inputted by said input means and the picture element data extracted by said extracting means.

2. A system according to claim 1, wherein a transmission mode information signal indicating a transmission mode determined by said transmission mode determining means is arranged to be transmitted along with picture element data.

3. A system according to claim 1, wherein said storing means is so arranged that a content stored therein concerning a specific picture element data is not changed, said specific element data corresponding to the block as to which said transmission mode determining means assigns the transmission mode in which all of the predetermined number of picture element data constituting the respective blocks are transmitted.

4. An image information signal transmitting method comprising:

(a) a first step of inputting an image information signal composed of a plurality of picture element data corresponding to one picture;

(b) a second step of storing the plurality of picture element data inputted by said input means in blocks each of which is composed of predetermined number of picture element data;

(c) a third step of dividing the plurality of picture element data inputted in said first step into the blocks, extracting from each of the blocks a fewer number of picture element data than the predetermined number of picture element data constituting the respective blocks and outputting the extracted picture element data;

(d) a fourth step of interpolating picture element data which has not been extracted in said third step by using picture element data which has been extracted in said third step to restore the plurality of picture element data;

(e) a fifth step of comparing the plurality of picture element data inputted in said first step with the plurality of picture element data restored in said fourth step for every one of the blocks to obtain differences therebetween, and computing the sum of the differences for every one of the blocks to output the sum as first computed data;

(f) a sixth step of comparing the plurality of picture element data inputted in said first step with the plurality of picture element data stored in said second step for every one of the blocks to obtain differences therebetween and computing the sum of the differences for every one of the blocks to output the sum as second computed data;

(g) a seventh step of computing and outputting third computed data by multiplying the first computed data outputted in said fifth step by a first constant, adding the result of multiplication to the second computed data outputted in said sixth step, subtracting a second constant from the result of the addition and, after that, multiplying the result of the subtraction by a third constant;

(h) an eighth step of computing and outputting fourth computed data by multiplying the second computed data outputted in said sixth step by a fourth constant and adding the result of the multiplication to the first computed data outputted in said fifth step;

(i) a ninth step of comparing a level of the second computed data outputted in said sixth step with that of fifth computed data obtained by multiplying the first computed data outputted in said fifth by a fifth constant and adding a sixth constant to the result of the multiplication, and outputting discrimination data indicative of the kind of computed data which is found to be at a lower level as a result of the comparison;

(j) a tenth step of selectively outputting one of the third computed data outputted in said seventh step and the fourth computed data outputted in said eight step according to the discrimination data outputted in said seventh step;

(k) an eleventh step of determining a transmission mode to be selected for every one of the blocks, according to the data outputted in said tenth step and the discrimination data outputted in said ninth step, from between a transmission mode in which all the predetermined number of picture element data constituting the blocks are transmitted and a transmission mode in which not all of the predetermined number of picture element data are transmitted for each of the blocks; and (l) a twelfth step of selectively outputting, in accordance with the transmission mode determined in said eleventh step, one of the plurality of picture element data inputted in said first step and the picture element data extracted in said third step.

5. A method according the claim 4, wherein said image information signal transmitting method further comprises a thirteenth step of transmitting a transmission mode information signal indicative of the transmission mode determined in said eleventh step.

6. A method according to claim 4, wherein in said second step, a content stored in said second step concerning specific picture element data is not changed, said specific picture element data corresponding to the block as to which said transmission mode determining means assigns the transmission mode in which all of the predetermined number of picture element data constituting said block are transmitted.

* * * * *